(No Model.) 3 Sheets—Sheet 1.
J. LEWIS.
HEATING APPARATUS.
No. 372,032. Patented Oct. 25, 1887.
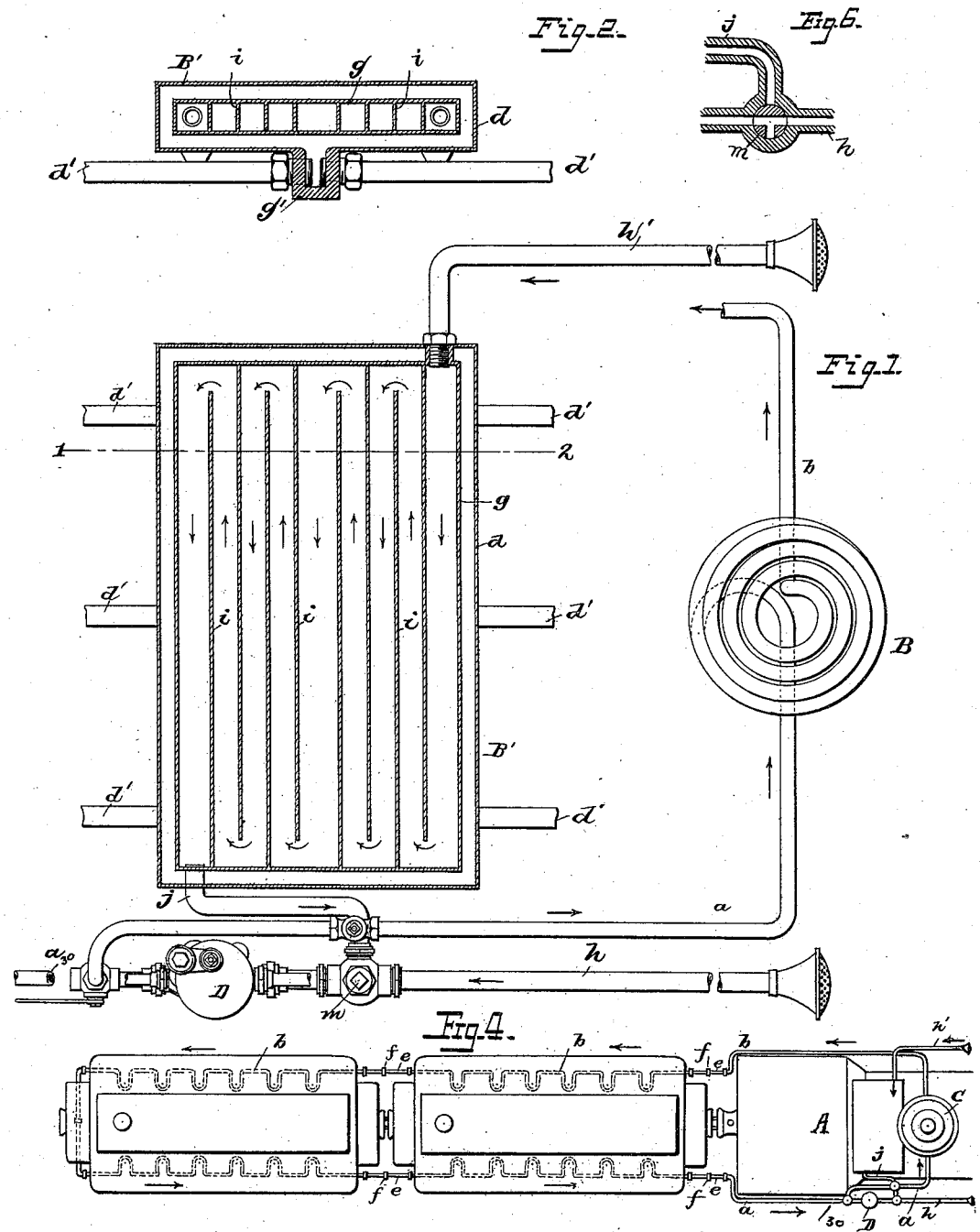

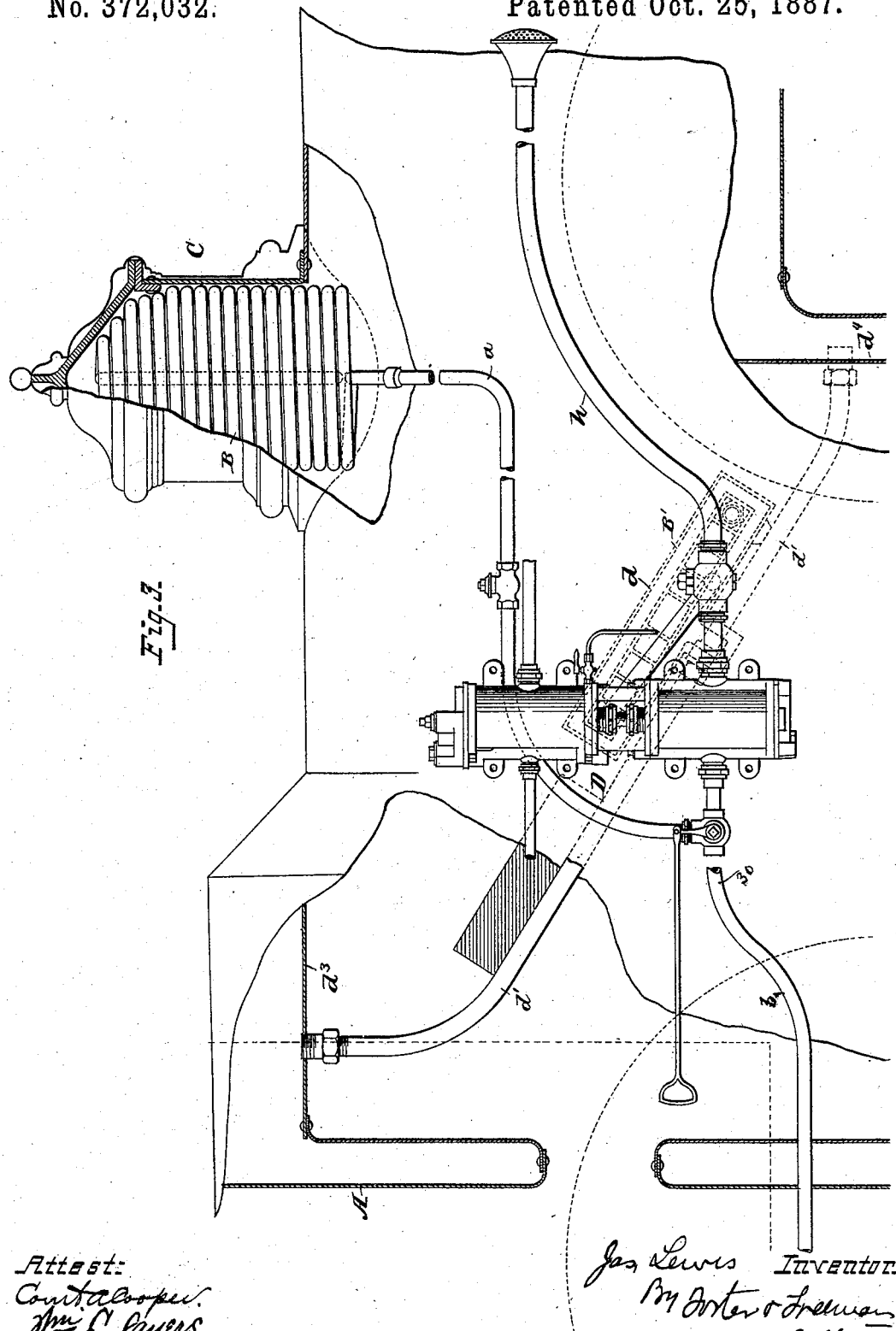

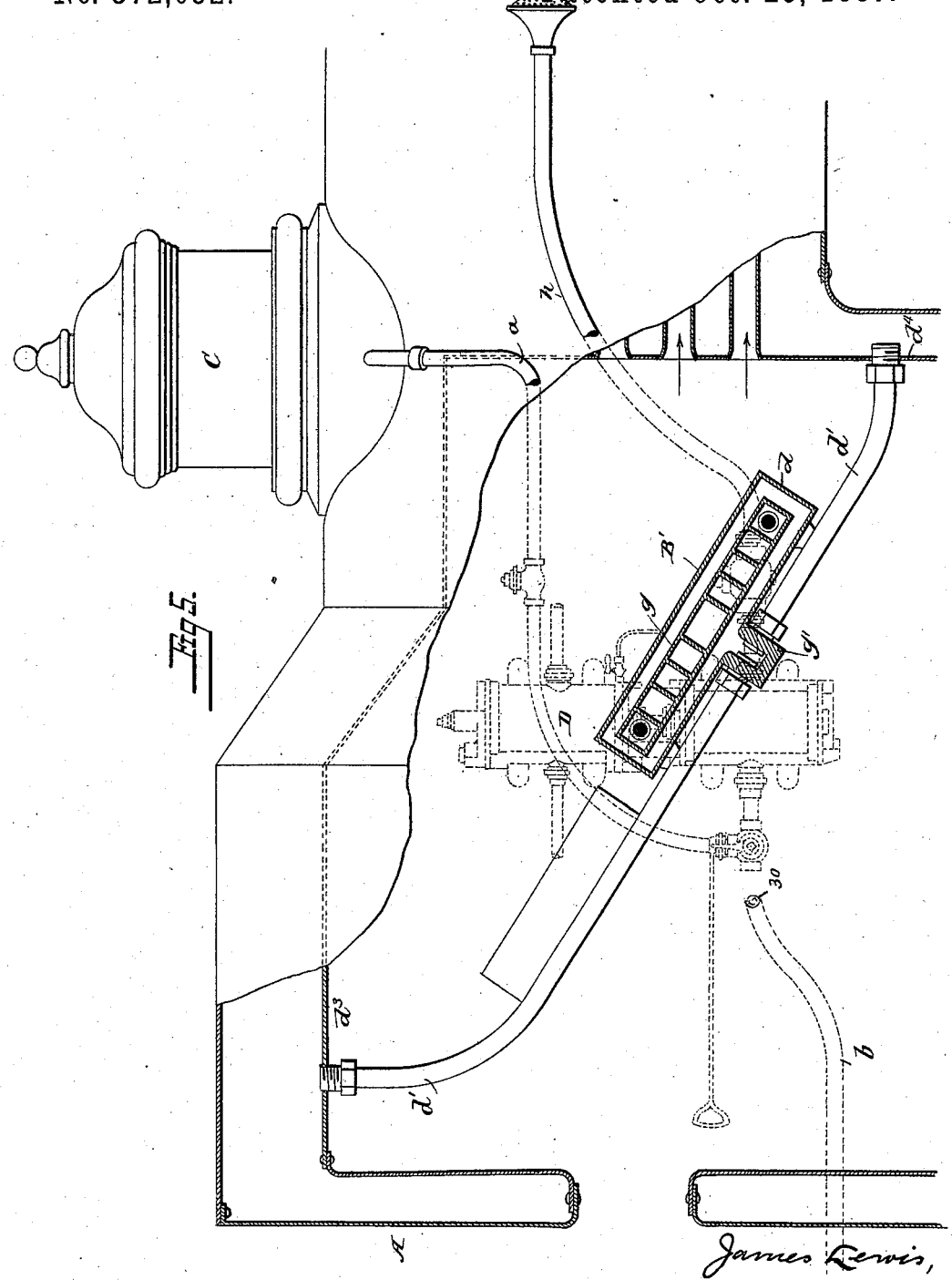

UNITED STATES PATENT OFFICE.

JAMES LEWIS, OF OIL CITY, PENNSYLVANIA, ASSIGNOR OF ONE-FOURTH TO FRANK M. ASHMEAD, OF SAME PLACE.

HEATING APPARATUS.

SPECIFICATION forming part of Letters Patent No. 372,032, dated October 25, 1887.

Application filed June 16, 1885. Serial No. 168,864. (No model.)

*To all whom it may concern:*

Be it known that I, JAMES LEWIS, a citizen of the United States, residing at Oil City, in the county of Venango and State of Pennsylvania, have invented certain new and useful Improvements in Heating Apparatus, of which the following is a specification.

My invention is an improvement in heating apparatus; and it consists in certain apparatus, fully set forth hereinafter, whereby to utilize for heating purposes a current of heated air, which is brought to the desired temperature by means of a heater arranged within the steam or water space of a boiler or steam-generator.

In the accompanying drawings, Figure 1 is a sectional plan illustrating part of my improved heating apparatus specially adapted for use in connection with locomotives having air-brake appliances. Fig. 2 is a section on the line 1 2, Fig. 1. Fig. 3 is a part sectional elevation of the boiler, pump, and air-pumps as arranged in a locomotive. Fig. 4 is a diagrammatic view illustrating the application of the heating apparatus to a train of railway-cars. Fig. 5 is a part longitudinal vertical section of my improved heating apparatus as arranged in a locomotive-boiler, the pump and connections being shown in dotted lines; and Fig. 6 is a horizontal section through the valve *m*.

In illustrating my improved mode of heating I have shown it in connection with apparatus adapted for use in heating railway-cars; but I have done so simply for the purpose of illustration, and not because the invention is applicable to this purpose alone, for it can be employed in heating dwellings, warehouses, and wherever steam is or can be used.

The heating apparatus consists, essentially, of a steam boiler or generator, A, of any suitable construction, an air-heater, B, arranged within the steam or water space, or both, of the generator, conducting-pipes leading to or forming parts of heat-radiators, and forming an air-conduit, including the said radiators and the heater within the steam-generator, and a pump or blower connected with the conduit, so as to force air into the same and maintain it in circulation.

When the generator is the boiler of a locomotive, I prefer to make use of the air-pump D of the braking apparatus to supply the heating-circuit with air and maintain the circulation of the latter; but when the system is used for heating dwellings, warehouses, &c., I of course use a special pump or blower, the steam generated in the boiler serving in most instances to operate the engine which imparts motion to the pump.

The air-heater is preferably in the form of a coil, which is arranged within the steam-space of a generator—for instance, within the dome C of a locomotive-boiler—and the circuit-pipes *a b* include the coil within the boiler, the pump which supplies air to the pipe, and the pipes or casings which extend within the cars or other chambers to be heated from said coils and pump, the end 30 of the pipe *b* being open to the air either outside the engine or at its exhaust. It is obvious that this pipe *b* may be open to the air at any point; hence, if less heat be required than when the air is allowed to complete the circuit of the pipe to its said end 30, the connection between the opposite ends of the pipe at the end of the last car or any intermediate car may be broken, and thus materially reduce the radiating-surface.

In order to permit the cars to be separated or connected in breaking or making up trains, the ends of the heating or conducting pipes are extended beyond the bumper-beams and are provided with flexible tubes *e* and couplings *f*, so that the adjacent pipes and adjacent cars may be coupled together and the opposite pipes of the terminal car may be connected, as illustrated in the diagram, Fig. 4.

The pump is provided with an inlet-opening or a pipe, *h*, through which the air may be drawn to said pump when desired.

By arranging a heater within the steam or water space of the generator the heating of the air to a dangerous temperature is prevented, for it will be evident that if the heater is arranged within the combustion-chamber or fire-pot of the generator the air might be raised to such a temperature as to set fire to objects in proximity to the conducting and radiating pipes.

In some instances I prefer to employ a box-heater in connection with the coil, and so connect said box-heater and coil that the air passes from one to the other, as from the box-heater to the coil, before entering the circulating-pipes. This arrangement is especially effective in connection with the locomotive-boilers, where the box-heater B' may be arranged within or above the combustion-chamber, as illustrated in Fig. 5 and by dotted lines in Fig. 3, and serve not only to secure a high but limited temperature to the air, but also to extend the water-heating surface of the generator. In this case the box-heater is in the form of a water-box, $d$, containing a smaller air-box, $g$, the latter of which is divided by partitions $i$, arranged so as to form a circuitous channel, into one end of which the air is admitted through the inlet-pipe $h'$, and from the other end of which it passes through a pipe, $j$, to the pump, and thence to and through the coil B to the circulating-pipes and radiators of the cars, and is thence exhausted; or said air may be utilized for heating a chamber, into which it is discharged from the circulating-pipes, or it may be conducted to the storage-reservoir of a car-braking apparatus and used in applying the brakes, with advantages which I need not here specify, as this will constitute the subject of a separate application for Letters Patent. When the air passes by pipe $h'$ through the box-heater B', the valve $m$ in pipe $h$ will of course be adjusted to permit the air from said heater to be drawn by the pump, and in this case the air-inlet end of said pipe $h$ will be shut off; or, if need be, the air drawn from this heater may be tempered by adjusting the valve to allow some air to be also drawn through said pipe $h$.

It will be evident that the air-heater may be arranged in different positions within the water and steam spaces of generators and that it may be of any construction which will permit the air to be passed in contact with the surfaces heated by contact with the water or steam, and it will also be evident that the radiators, which are put in communication with and form part of the circuit-pipes, may be of any of the usual or suitable constructions.

The box-heater B' is put into communication with the water chamber or space of the boiler by connecting the arch-pipes $d'$ $d'$, which extend from the crown-shell $d^5$ to the back wall or sheet, $d^4$, to a hollow projection or rib, $g'$, at the under side of the box, as shown by dotted lines in Fig. 3 and by full lines in Fig. 2, so that the water will circulate from the boiler through said box B'. The arch-pipes may, however, communicate with said box at any other point or points.

It will be seen that in the box-heater hereinbefore described, where the air-chamber is inclosed by the water-spaces, that the inner air-heating box, $g$, is practically in the water-space of the boiler, inasmuch as the water-space surrounding said box is in communication with the water-spaces of the boiler.

Without limiting myself to the precise construction and arrangement of parts shown, I claim—

1. The combination, in a heating apparatus, of a steam-generator, air-heaters arranged in the steam-space and in the combustion-chamber of the generator, and the latter having a surrounding water-space communicating with the water-space of the generator, radiators arranged within the apartments to be heated, and an air-pump whereby the air may be forced through the air-heaters and through the radiators, substantially as described.

2. The combination, in a heating apparatus, of the heaters B B', arranged in the steam and water spaces of the boiler, air-inlet pipes $h$ $h'$, connecting-pipe $j$, valve $m$, arranged to cut off the passage of air from one of the heaters and an air-pump in communication with said last-mentioned pipe for forcing the air through the air-conducting pipes, substantially as described.

3. The combination, in a heating apparatus, of the coil-heater B and the box-heater B', inlet-pipes $h$ $h'$, connecting-pipe $j$, and valve $m$, for controlling the passage of air from one of the heaters and air-pump, and air-conducting pipes through which the air is forced by the pump, substantially as described.

4. The combination, with the air-circulating pipes, pump, and boiler, of a heater in the boiler and a supplemental heater, consisting of a box, $d$, arranged within the combustion-chamber of the boiler and provided with channels communicating with the air-circulating pipes, and with a surrounding water-space communicating with the water-space of the boiler, substantially as described.

5. The combination, with the boiler and air-heater therein, of the water-box $d$, inclosing air-channels communicating with the air-circulating pipes, and arch-pipes $d'$ $d'$, communicating with and connecting the water spaces of the box and boiler, substantially as described.

6. The combination of a two-part air-heater, one within the steam and the other in the water space of a locomotive-boiler and independent of each other, an air-pump operated by steam from said boiler, air-radiators on the cars, and pipes connecting said radiators, air-heater, and pump, substantially as described.

In testimony whereof I have signed my name to this specification in the presence of two subscribing witnesses.

JAMES LEWIS.

Witnesses:
FRANK M. ASHMEAD,
HARLEY W. FISHER.